United States Patent
Miyatani et al.

(10) Patent No.: US 12,522,495 B2
(45) Date of Patent: Jan. 13, 2026

(54) BEVERAGE DISPENSING DEVICE, BEVERAGE DISPENSING METHOD, AND BEVERAGE DISPENSING SYSTEM

(71) Applicants: Asahi Group Holdings, Ltd., Tokyo (JP); ASAHI BREWERIES, LTD., Tokyo (JP)

(72) Inventors: Tomohisa Miyatani, Moriya (JP); Takashi Wada, Kobe (JP); Kenji Kusunoki, Kobe (JP); Takuya Komura, Kobe (JP)

(73) Assignees: ASAHI GROUP HOLDINGS, LTD., Tokyo (JP); ASAHI BREWERIES, LTD., Tokyo (JP)

( * ) Notice: Subject to any disclaimer, the term of this patent is extended or adjusted under 35 U.S.C. 154(b) by 175 days.

(21) Appl. No.: 18/289,650

(22) PCT Filed: May 9, 2022

(86) PCT No.: PCT/JP2022/019705
§ 371 (c)(1),
(2) Date: Nov. 6, 2023

(87) PCT Pub. No.: WO2022/239743
PCT Pub. Date: Nov. 17, 2022

(65) Prior Publication Data
US 2024/0253967 A1 Aug. 1, 2024

(30) Foreign Application Priority Data
May 11, 2021 (JP) .................. 2021-080608

(51) Int. Cl.
*B67D 1/12* (2006.01)
*B67D 1/00* (2006.01)
*F16K 7/04* (2006.01)

(52) U.S. Cl.
CPC ............ *B67D 1/1277* (2013.01); *F16K 7/045* (2013.01); *B67D 2001/0093* (2013.01)

(58) Field of Classification Search
CPC .......... B67D 2001/0093; B67D 1/1277; F17K 7/045
See application file for complete search history.

(56) References Cited

U.S. PATENT DOCUMENTS

| 8,833,405 B2 * | 9/2014 | Phallen | G05D 7/0652 |
| | | | 141/94 |
| 2008/0197156 A1 | 8/2008 | Wauters et al. | |

(Continued)

FOREIGN PATENT DOCUMENTS

| JP | 2000-318799 A | 11/2000 |
| JP | 2007-537951 A | 12/2007 |

(Continued)

OTHER PUBLICATIONS

International Search Report (PCT/ISA/210) issued in PCT/JP2022/019705, dated Jul. 26, 2022.

(Continued)

*Primary Examiner* — Timothy L Maust
(74) *Attorney, Agent, or Firm* — Birch, Stewart, Kolasch & Birch, LLP (57) ABSTRACT

Provided is a beer dispensing device not requiring cleaning by using a disposable flexible tube to form a beer passage, and also provided is a device capable of dispensing foam as well as beer, using a single flexible tube. A beverage dispensing device 1 using a combination of tubes 12 having an elastically portion that is elastically deformable as a passage of a beverage 20 comprises a mechanism 32 configured to set the bore of the flexible portion to a first state having a first cross-sectional area or a second state having a second cross-sectional area smaller than the first cross-sectional area, selectively, and when the bore of the flexible portion is set to the second state, foam is generated from the beverage flowing through the tube.

13 Claims, 5 Drawing Sheets

(56) References Cited

U.S. PATENT DOCUMENTS

2012/0248139 A1* 10/2012 Haskayne ............ B67D 1/0841
222/400.7
2021/0061636 A1 3/2021 Ferreira et al.

FOREIGN PATENT DOCUMENTS

| JP | 2020-109009 A | 7/2020 |
|----|---------------|--------|
| WO | WO 2017/208808 A1 | 12/2017 |
| WO | WO 2019/126850 A1 | 7/2019 |
| WO | WO 2020/099287 A1 | 5/2020 |

OTHER PUBLICATIONS

Written Opinion of the International Searching Authority (PCT/ISA/237) issued in PCT/JP2022/019705, dated Jul. 26, 2022.
Extended European Search Report for European Application No. 22807444.9, dated Mar. 7, 2025.
International Preliminary Report on Patentability and English translation of the Written Opinion of the International Searching Authority for International Application No. PCT/JP2022/019705, dated Nov. 23, 2023.

* cited by examiner

BEVERAGE DISPENSING DEVICE, BEVERAGE DISPENSING METHOD, AND BEVERAGE DISPENSING SYSTEM

TECHNICAL FIELD

The present invention relates to a device, a method, and a system for dispensing a beverage.

BACKGROUND ART

Conventionally, a mechanism for dispensing beer foam into a glass in the final process of dispensing beer has been disclosed. For example, Patent Document 1 discloses a device including two passages for a beer outlet and a foam outlet. To dispense beer, an operation lever is moved in one direction to open a first valve to guide beer to the beer outlet. To dispense foam, the operation lever is moved in the opposite direction to open a second valve to guide the beer to the foam outlet.

Patent Document 2 discloses a device including a valve body disposed in a beer passage and connected to a tapping handle. To dispense beer, by moving the tapping handle to one side, the valve body is caused to move by a large extent to open a passage with a larger cross-sectional area. To dispense foam, by moving the tapping handle to the opposite direction, the valve body is caused to move slightly to open a passage with a smaller cross-sectional area (foaming passage).

PRIOR ART DOCUMENTS

Patent Documents

Patent Document 1: JP 2000-318799 A
Patent Document 2: WO 2020/099287 A

SUMMARY OF THE INVENTION

Problems to be Solved by the Invention

However, both of the devices described in Patent Document 1 and Patent Document 2 are configured to switch the operations for dispensing beer and for poring foam by moving the valve body installed inside the beer passage. Therefore, at the time of cleaning, the beer passage may not be cleaned sufficiently and completely, merely by flushing cleaning water thereinto. In addition, in order to clean flawlessly, it is necessary to keep flushing the cleaning solution for a long time, and this requires extensive time and effort. Furthermore, to simplify on-site cleaning, it is possible to design every member making up the passage, including the valve body, to be replaceable or disposable, but this solution has a problem in terms of cost and molding precision.

Therefore, an object of the invention according to the present application is to provide a device and a system including a disposable flexible tube as a passage, and capable of dispensing a beverage as well as foam by changing the cross section of the bore of the flexible tube.

Solutions to the Problems

To achieve this end, an embodiment of the beverage dispensing device according to the present invention is a beverage dispensing device that uses a combination of tubes each having a flexible portion that is elastically deformable as a passage of a beverage, the beverage dispensing device including a mechanism configured to set a bore of the flexible portion to a first state having a first cross-sectional area or a second state having a second cross-sectional area that is smaller than the first cross-sectional area, selectively, and when the bore of the flexible portion is in the second state, foam is generated from the beverage flowing through the tube.

In another embodiment of the beverage dispensing device according to the present invention, the mechanism comprises a pressing mechanism for pressing the flexible portion.

In another embodiment of the beverage dispensing device according to the present invention, the pressing mechanism including a pressing portion including a pair of members that face each other with the flexible portion interposed therebetween.

In another embodiment of the beverage dispensing device according to the present invention, one member of the pair of members of the pressing portion is a holder member that is brought into contact with the flexible portion and holds the flexible portion when the bore of the flexible portion is in the first state and the second state, and another member of the pair of members is a pressing member that is caused to press the flexible portion when the bore of the flexible portion is switched from the first state to the second state.

In another embodiment of the beverage dispensing device according to the present invention, the other member comprises a protruding portion protruding toward the one member and configured to press the flexible portion in the second state, and a non-protruding portion configured not to press the flexible portion in the second state.

In another embodiment of the beverage dispensing device according to the present invention, the other member comprises: a pair of protruding portions protruding toward the one member and facing each other with a central axis of the flexible portion that is disposed between the pair of members interposed therebetween; and a groove provided between the pair of protruding portions.

In another embodiment of the beverage dispensing device according to the present invention, the groove is designed to have such a depth that the flexible portion in the second state does not come into contact with a bottom surface of the groove.

In another embodiment of the beverage dispensing device according to the present invention, chamfered portions are provided to ends of the pair of respective protruding portions, the ends facing the flexible portion.

In another embodiment of the beverage dispensing device according to the present invention, the pressing member is disposed above the flexible portion and the holder member is disposed under the flexible portion.

In another embodiment of the beverage dispensing device according to the present invention, the pressing mechanism presses only a part of a cross section of the flexible portion in the second state.

In another embodiment of the beverage dispensing device according to the present invention, the flexible portion has a part in which the cross section of the bore has a substantially semicircular shape or a substantially crescent shape, in the second state.

In another embodiment of the beverage dispensing device according to the present invention, the flexible portion has a part inner surfaces of which come into contact with each other, the part being a part pressed and caused to deform by the pair of members, in the second state.

In another embodiment of the beverage dispensing device according to the present invention, the one member comprises a projection at a position coming into contact with a central portion of the flexible portion.

In another embodiment of the beverage dispensing device according to the present invention, the pressing portion comprises a pair of side walls provided integrally with the one member or the other member, and facing each other with the flexible portion interposed therebetween in a direction perpendicular to a direction in which the one member and the other member face each other.

In another embodiment of the beverage dispensing device according to the present invention, an interval between the pair of side walls is designed to such a size that the flexible portion does not come into contact with the pair of side walls when the flexible portion is in the first state and when the flexible portion is in the second state.

In another embodiment of the beverage dispensing device according to the present invention, the second cross-sectional area is 0.2 mm$^2$ to 1.0 mm$^2$.

In another embodiment of the beverage dispensing device according to the present invention, the pressing member is driven by an actuator.

In another embodiment of the beverage dispensing device according to the present invention, the beverage dispensing device and/or the tube comprises a passage opening/closing mechanism for opening/closing the passage of the beverage.

In another embodiment of the beverage dispensing device according to the present invention, the passage opening/closing mechanism comprises a pinch valve.

In another embodiment of the beverage dispensing device according to the present invention, an opening/closing portion of the passage, the opening/closing portion being opened and closed by the passage opening/closing mechanism, is located upstream of the flexible portion in a direction in which the beverage is transported.

In another embodiment of the beverage dispensing device according to the present invention, the beverage dispensing device comprises an operation unit, and
  the operation unit is capable of selecting any one of a state for dispensing no beverage, a state for dispensing a beverage, and a state for dispensing foam,
  when the state for dispensing no beverage is selected on the operation unit, the flexible portion is switched to the first state, and the passage opening/closing mechanism closes the passage so that no beverage is dispensed,
  when the state for dispensing the beverage is selected on the operation unit, the flexible portion is switched to the first state, and the passage opening/closing mechanism opens the passage so that the beverage is dispensed, and
  when the state in which for dispensing foam is selected on the operation unit, the flexible portion is switched to the second state, and the passage opening/closing mechanism opens the passage so that the foam is dispensed.

In another embodiment of the beverage dispensing device according to the present invention, the beverage is a foaming beverage.

In another embodiment of the beverage dispensing device according to the present invention, the beverage is beer or a beer-taste beverage.

In another embodiment of the beverage dispensing device according to the present invention, a flow rate of the beverage is between 5.0 ml/s and 10.0 ml/s when the bore of the flexible portion is in the second state.

In another embodiment of the beverage dispensing device according to the present invention, the bore of the flexible portion that enables the first state or the second state to be selected has a length between 1.0 mm and 10.0 mm.

In another embodiment of the beverage dispensing device according to the present invention, a pressure for pumping the beverage is 0.1 MP to 0.3 MP.

A beverage dispensing system according to the present invention comprises a combination of the beverage dispensing device described above, and a tube including a flexible portion that is elastically deformable as a passage of the beverage.

In another embodiment of the beverage dispensing system according to the present invention, the tube is attachable to and detachable from the beverage dispensing device.

In another embodiment of the beverage dispensing system according to the present invention, the beverage dispensing system comprises a transport mechanism for transporting the beverage from a beverage storage container to the tube, and
  the transport mechanism comprises a gas supply mechanism for supplying gas into the beverage storage container, and
  the gas supply mechanism is configured to apply a pressure of 0.1 MPa or higher to the beverage, constantly.

An embodiment of the beverage dispensing method according to the present invention is a method of dispensing a beverage using a tube having a flexible portion that is elastically deformable as a passage for the beverage, the method comprising steps of:
  dispensing the beverage via the tube, by setting a bore of the flexible portion to a first state having a first cross-sectional area; and
  generating foam from the beverage flowing through the tube, by setting the bore of the flexible portion from the first state having the first cross-sectional area to a second state having a second cross-sectional area smaller than the first cross-sectional area.

Effects of the Invention

With the beverage dispensing device, the beverage dispensing method, and the beverage dispensing system according to the embodiment described above, it is possible to dispense beer and dispense foam using one flexible tube. In addition, a clean beer dispensing passage can be achieved only by replacing the tube. Therefore, cleaning of the beer dispensing passage is rendered unnecessary.

BRIEF DESCRIPTION OF THE DRAWINGS

FIG. 2(a) is an enlarged sectional view taken along a plane orthogonal to a central axis of the tube, and FIG. 2(b) is an enlarged sectional view taken along a plane including the central axis of the tube.

FIG. 3(a) is an enlarged sectional view taken along a plane orthogonal to the central axis of the tube, and FIG. 3(b) is an enlarged sectional view taken along a plane including the central axis of the tube.

DETAILED DESCRIPTION

A beverage dispensing device according to an embodiment of the present invention will now be explained with reference to the accompanying drawings. The beverage is a foaming beverage. The foaming beverage contains carbon dioxide gas, and is typically beer. The foaming beverage may comprise, in addition to beer, beer-taste beverages (e.g., low-malt beer, alcohol-free beer) and other beverages foaming under the exposure to the atmosphere. Examples of the beverages are those having a NIBEM value of preferably 20 or higher, more preferably 40 or higher, and still more preferably 60 or higher. The NIBEM value is a value used as an index indicating the foam stability characteristic of a foaming beverage such as beer. As a method for measuring the NIBEM value, refer to "Methods of Analysis of BCOJ (Revised Edition)" (Brewing Society of Japan).

[A. Overall Configuration]

Figure 1:
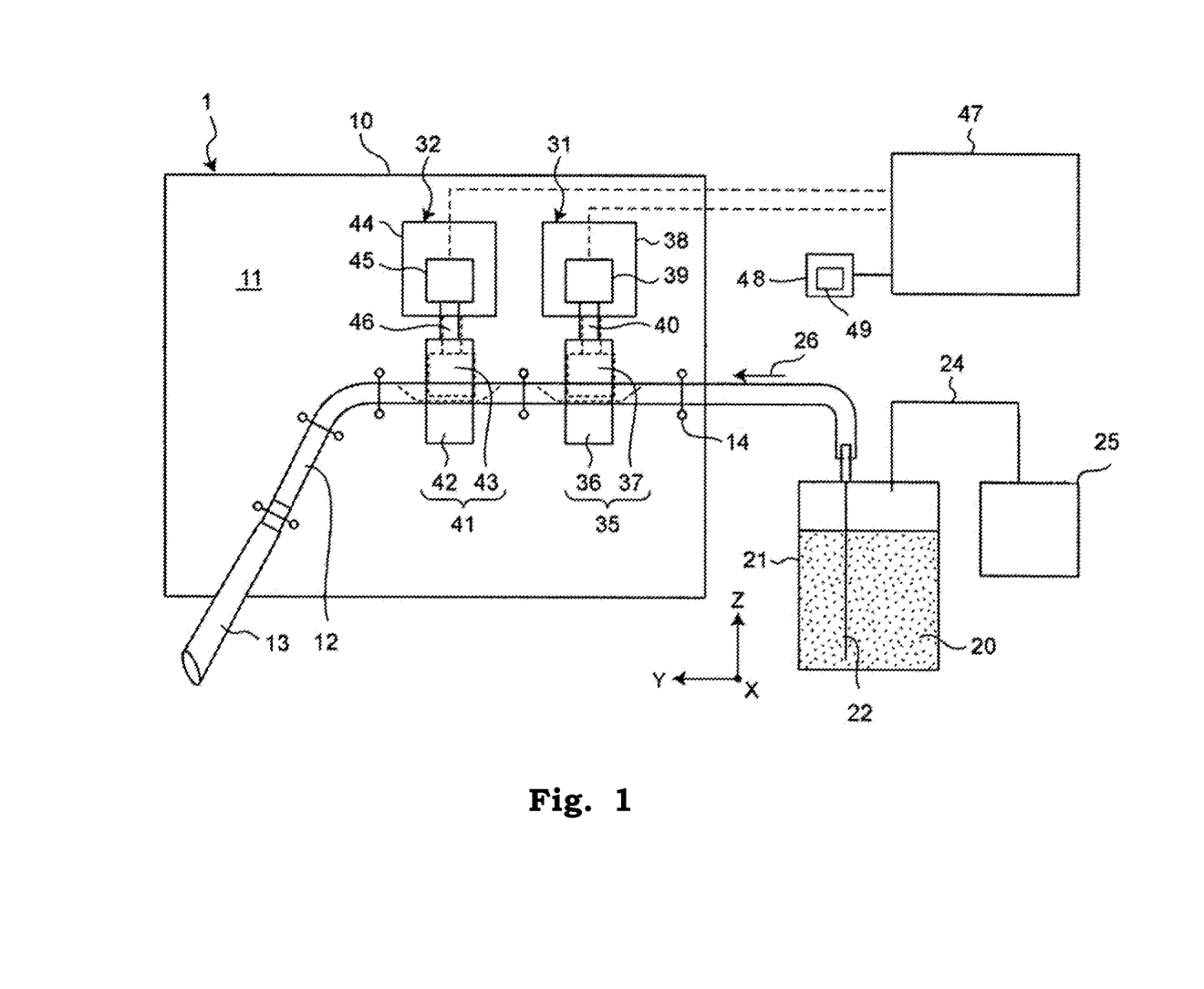
FIG. 1 is a schematic showing a configuration of a beverage dispensing device having a foaming mechanism according to the present invention.

FIG. 1 shows a schematic configuration of a beverage dispensing device (hereinafter, referred to as a "dispensing device") 1 according to the embodiment. The beverage dispensing device 1 can be installed in an air cooler including an internal beverage storage container containing a beverage and capable of capable cooling the container, or a tower provided on an outer wall surface or an upper part of an instantaneous cooler capable of rapidly cooling a beverage passed inside the cooler, for example.

The dispensing device 1 according to the embodiment comprises a beverage dispensing unit 10. The beverage dispensing unit 10 has a wall 11 or a support member extending in the vertical direction. The wall 11 may be, for example, one of inner surfaces of a housing of the beverage dispensing unit 10.

An elastically deformable cylindrical hollow beverage transport tube (hereinafter, referred to as a "tube") 12 made of a flexible material is disposed inside the housing. In the embodiment, a silicone tube is used across the entire length of the tube 12, as an example. As to the size (the outer diameter and the inner diameter) of the tube 12, a silicone tube having an outer diameter between 3.0 mm and 12.00 mm and an inner diameter between 1.0 mm and 8.0 mm may be used. Preferably, the size of the silicone tube has an outer diameter between 5.0 mm and 6.00 mm, and an inner diameter between 3.0 mm and 4.0 mm.

A beverage dispensing nozzle (hereinafter, referred to as a "nozzle") 13 is connected to one end of the tube 12 (the lower end portion in the drawing). A plurality of support members 14 provided on the wall 11 support the tube 12 and the nozzle 13 inside the housing. The tube 12 and the nozzle 13 are configured to be replaceable with another tube and nozzle, by detaching from the support members 14.

A base end (upper end in the drawing) of the tube 12 extends rearwards of the wall 11, and is connected to a beverage storage container containing the beverage 20. In the embodiment, a barrel 21 is used as the beverage storage container. The barrel 21 comprises a beverage pick-up tube 22, and a base end of the tube 12 is connected to the beverage pick-up tube 22.

The barrel 21 has a transport mechanism for transporting the beverage 20 into the tube 12. In this embodiment, the transport mechanism comprises, for example, a dispensing head, a spear valve, and a carbon dioxide gas cylinder 25 connected to the dispensing head via a gas supply pipe 24. The beverage 20 is transported into the tube 12 by the pressure of the carbon dioxide gas injected into the barrel 21 from the carbon dioxide gas cylinder 25.

The beverage storage container may be an inner bag type container including an outer container that is not easily deformable, and an easily deformable inner bag that stores therein the beverage. In such a case, the transport mechanism introduces the air between the outer container and the inner bag using a pump, for example, to transport the beverage 20 into the tube 12 by the pressure. The dispensing head, the spear valve, or some of such parts may be replaced with other parts having the same similar functions and such parts may be made of resin so as to make these parts disposable.

Two valve units, a first valve unit (beverage dispensing unit) 31 and a second valve unit (foaming unit) 32, for controlling dispensing of the beverage 20 are fixed to the wall 11. In the embodiment, the first valve unit 31 is disposed on the upstream side, and the second valve unit 32 is disposed on the downstream side, in the transportation direction of the beverage 20 (in the direction of the arrow 26).

[First Valve Unit]

The first valve unit 31 is a device or mechanism for dispensing a beverage, by switching the cross section of the tube bore 33 between a non-deformed state (first state) that is an open state, and a deformed state (second state) that is a closed state. In the open state, no external force is applied to the tube 12 so that the beverage 20 can be transported. The closed state is a state in which a force is applied to the tube 12 from the outside, and the bore 33 is completely closed, so that the flow of the beverage is blocked.

In order to switch the cross section of the tube bore 33 between the open state and the closed state, the first valve unit 31 is provided as what is called a pinch valve, and comprises pressing mechanisms (pressing portions) 35 facing each other with the tube 12 interposed therebetween. In the embodiment, the pressing mechanism 35 comprises a lower block (pressing member or holder member) 36 disposed below the tube 12 and an upper block 37 (pressing member) disposed above the tube 12. The lower block 36 is fixed to the wall 11. The upper block 37 is connected to a driving unit 38 that is fixed to the wall 11. In the embodiment, the driving unit 38 comprises a pull solenoid 39. The pull solenoid 39 has a plunger (movable portion) 40 connected to the upper block 37. The pull solenoid 39 in a non-energized state keeps the plunger 40 advanced so that the upper block 37 is positioned closer to the lower block 36, and, in an energized state, keeps the plunger 40 retracted so that the upper block 37 is positioned away from the lower block 36. In other words, by driving the pull solenoid 39, the upper block 37 is caused to move between a position separated from the tube 12 (hereinafter, referred to as a "retracted position") to bring the tube bore 33 to the open state (the position indicated with solid lines in the drawing), and a position where the tube 12 is compressed (hereinafter, referred to as an "advanced position") to bring the tube bore 33 to the closed state (the position indicated with the dotted lines in the drawing).

Note that the first valve unit only needs to have a structure enabled to be switched between a state allowing the beverage 20 to be transported and a state no allowing the beverage 20 to be transported, and may have a structure in which a valve is provided in the tube 12, and the valve is switched to open and to close by operating the beverage dispensing device 1.

[Second Valve Unit]

Figure 2:
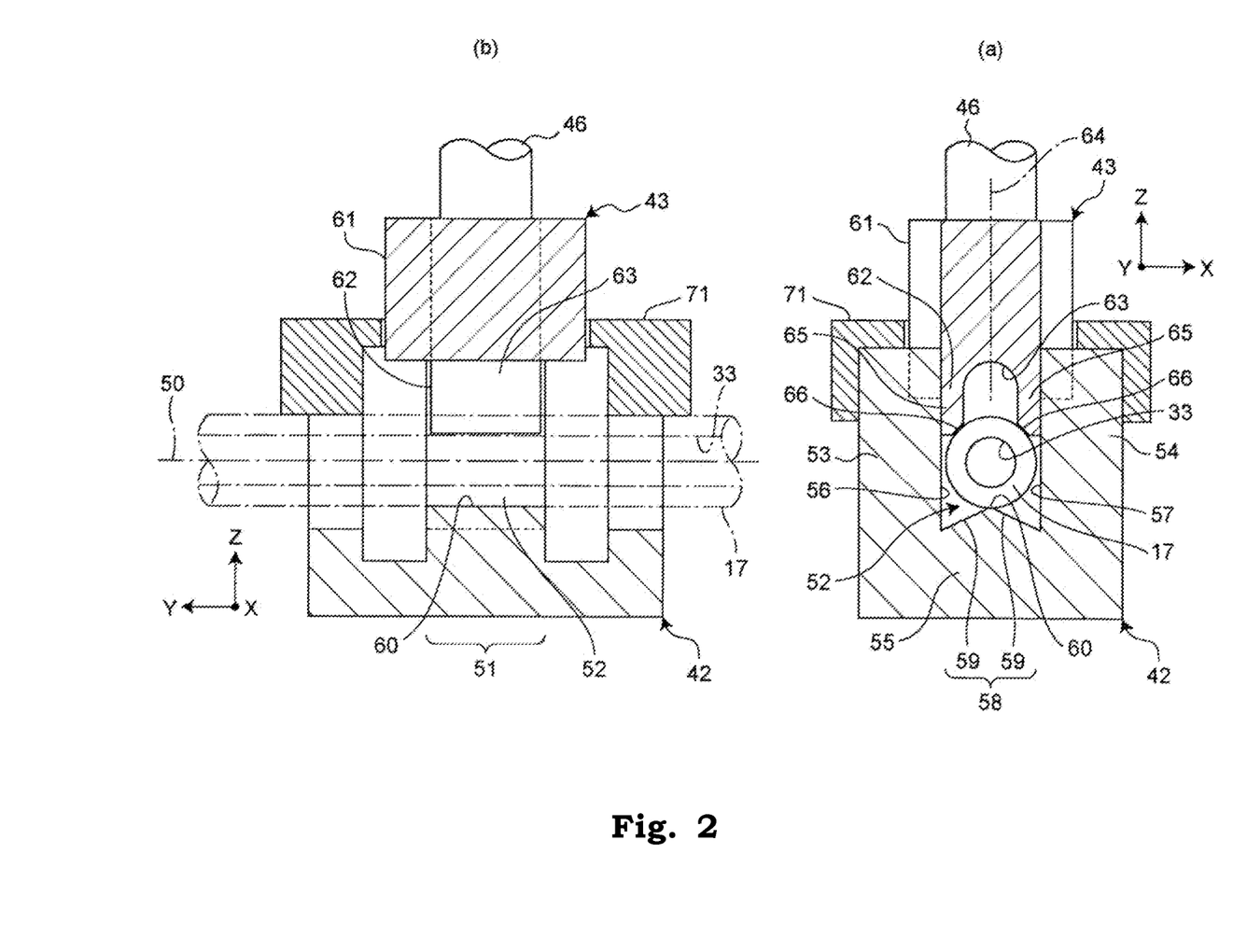
FIG. 2 is a schematic showing a tube pressing portion of the foaming mechanism shown in FIG. 1, at the time of dispensing a beverage, where
Figure 4:
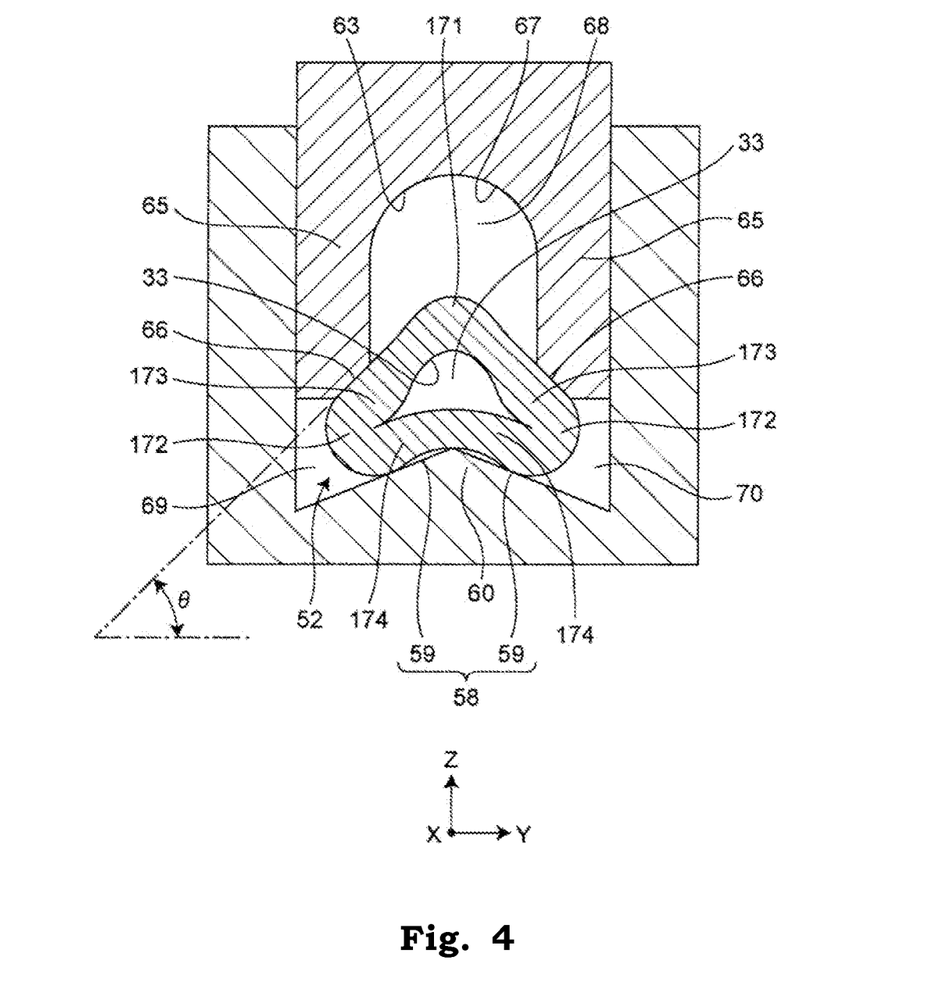
FIG. 4 is an enlarged sectional view of the tube squashed by the tube pressing portion shown in FIGS. 2 and 3.

The second valve unit 32 is a foaming device or mechanism that switches the cross section of the tube bore 33 between a non-deformed state (non-compressed state) (first state) [see FIG. 2] that is a non-compressed state, and a deformed state (compressed state) (second state) [see FIG. 4]. The non-compressed state is a state in which no external force is applied to the tube 12, and the beverage 20 can be transported. Thus, the non-compressed state is substantially the same as the open state of the first valve unit 31. The compressed state is a state in which a force applied is to the tube 12 from the outside, to reduce the cross section of the bore 33. In the compressed state, as the beverage 20 passes through the compressed cross section of the bore and is pressurized, carbon dioxide gas dissolves into the beverage 20 excessively, so that, after passing through the compressed cross section of the bore, the beverage 20 is decompressed, to cause the carbon dioxide gas dissolved in the beverage 20 to foam.

In order to switch the tube cross section between the non-compressed state and the compressed state in the manner described above, the second valve unit 32 has the pressing mechanisms (pressing portions) 41 facing each other, with the tube 12 interposed therebetween. In the embodiment, the pressing mechanism 41 comprises a lower block (pressing member or holder member) 42 disposed below the tube 12 and an upper block 43 (pressing member) disposed above the tube 12. The lower block 42 is fixed to the wall 11. The upper block 43 is connected to a driving unit 44 fixed to the wall 11. In the embodiment, the driving unit 44 comprises a push solenoid 45. A plunger (movable portion) 46 of the push solenoid 45 is connected to the upper block 43. The push solenoid 45 in the non-energized state keeps the plunger 46 retracted so that the upper block 43 is positioned away from the lower block 42, and, in the energized state, keeps the plunger 46 advanced so that the upper block 43 is positioned closer to the lower block 42. In other words, with the driving of the push solenoid 45, the upper block 43 is caused to move between a position separated from the tube 12 (hereinafter, referred to as a "retracted position") to put the tube bore 33 into the non-compressed state, and a position pressing the tube 12 (hereinafter, referred to as an "advanced position") to put the tube bore 33 into the compressed state.

[Control Unit]

The solenoids 39 and 45 described above are connected to the control unit 47, and are caused to operate in response to signals output from the control unit 47. The dispensing device 1 also comprises an operation unit 48 on which the user makes an operation to dispense the beverage 20, and executes an operation described below based on a signal input to the control unit 47 via the operation unit 48. The operation unit 48 comprises a switch 49 switched among three states including a state for dispensing no beverage, a state for dispensing the beverage, and a state for dispensing foam (foaming state).

[B. Operation]

An operation of the beverage dispensing device 1 having the configuration described above will now be explained briefly.

[Standby State (State not Dispensing Beverage)]

In a standby state prior to dispensing the beverage, the control unit 47 keeps both the pull solenoid 39 of the first valve unit 31 and the push solenoid 45 in the second valve unit 32 in the OFF state (non-energized state). As a result, the upper block 37 of the first valve unit 31 takes the advanced position (the position shown in dotted line in FIG. 1) closer to the fixed block 37, and closes the cross section of the tube bore 33 to block the flow of the beverage 20. By contrast, the push solenoid 45 of the second valve block 32 is brought to the retracted position (the position shown in the solid line in FIG. 1) away from the tube 12, and keeps the cross section of the tube bore 33 in the non-compressed state. Even in the standby state, it is preferable for the beverage in the barrel 21 and the tube 12 to be applied with a pressure equal to or higher than a normal pressure (0.1 MPa), e.g., a pressure of 0.15 MPa to 0.3 MPa. In this manner, it is possible to prevent entry of the air into the tube 12 via parts such as the first valve unit, and to prevent carbon dioxide gas from escaping from the beverage. For example, when the temperature of the beverage 20 in the barrel 21 is adjusted to 15° C. or lower using an air cooler, the pressure applied to the beverage is preferably MPa 0.1 to 0.2 MPa. When the temperature of the beverage 20 in the barrel 21 is adjusted to 15° C. or higher by using an instantaneous cooler, the pressure applied to the beverage is preferably 0.2 MPa to 0.3 MPa. By applying such a pressure, a silicone tube having an outer diameter of 5.0 mm and an inner diameter of 3.0 mm in a free state (with no pressure applied to the bore) comes to have an outer diameter of about 6.5 mm and an inner diameter of about 5.15 mm, for example.

[Dispensing Beverage]

To dispense the beverage, when the user operates the switch 49 of the operation unit 48 and selects the state for dispensing the beverage, the control unit 47 switches the pull solenoid 39 of the first valve unit 31 to the ON state (energized state) and maintains the push solenoid 45 of the second valve unit 32 to the OFF state (non-energized state), based on an activation signal output from the operation unit 48. As a result, the upper block 37 of the first valve unit 31 is caused to move to the retracted position (the position indicated with a solid line in FIG. 1) away from the lower block 36 and the tube 12, and switches the tube bore 33 to the open state. By contrast, the upper block 43 of the second valve unit 32 is maintained in the retracted position, and the cross section of the tube bore 33 is kept in the non-compressed state. As a result, the beverage 20 in the barrel 21 is dispensed from the nozzle 13 via the beverage pick-up tube 22 and the tube 12.

While the beverage is being dispensed, the beverage 20 is sent through the tube 12 at a pressure of 0.1 MPa to 0.3 MPa, for example, and the beverage is dispensed at a rate of 15 ml to 30 ml per second. The pressure for sending the beverage 20 is, for example, preferably 0.1 MPa to 0.2 MPa when the temperature of the beverage 20 in the barrel 21 is adjusted to 15° C. or lower using an air cooler, and is preferably 0.2 MPa to 0.3 MPa when the temperature of the beverage 20 in the barrel 21 is adjusted to 15° C. or higher using an instantaneous cooler.

In this manner, the tube 12 functions as a beverage dispensing passage when the beverage is dispensed.

After dispensing the beverage, when the user operates the switch 49 of the operation unit 48 to release the selection of the state for dispensing the beverage, the dispensing device 1 enters the standby state, and the control unit 47 sets both the pull solenoid 39 of the first valve unit 31 and the push solenoid 45 of the second valve unit 32 to the OFF state (non-energized state). In this manner, the flow of the beverage 20 inside the tube 12 is blocked.

[Foaming]

After dispensing a predetermined amount of beverage, when the user operates the switch 49 of the operation unit 48 to select the foaming state, the control unit 47 switches the pull solenoid 39 of the first valve unit 31 to the ON state (energized state), and further switches the push solenoid 45 of the second valve unit 32 to the ON state (energized state), based on a foaming start signal output from the operation unit 48. As a result, the upper block 37 of the first valve unit 31 is caused to move to the retracted position (the position indicated with a solid line in FIG. 1) away from the lower block 36 and the tube 12, and switches the tube bore 33 to the open state. The upper block 43 of the second valve unit 32, on the other hand, is caused to move from the retracted position to the advanced position (the position indicated by the dotted lines in FIG. 1), and presses the tube 12 to compress the cross section of the tube bore 33. As a result, the beverage 20 sent via the tube 12 is pressurized while passing through the tube bore 33 having the cross section compressed, and cause the carbon dioxide gas to dissolve excessively. After passing through the bore with the compressed cross section, the pressure is released, and the carbon dioxide gas having dissolved in the beverage 20 turns into foam. The foam is then dispensed via the nozzle 13 onto the beverage having been already dispensed. In this manner, a foamed beverage is served. In the manner described above, the tube 12 serves a beverage foaming passage at the time of foaming.

At the time of foaming, the beverage 20 is sent through the tube 12 at a pressure of, for example, 0.1 MPa to 0.3 MPa, and 5 ml to 15 ml of the beverage is dispensed out as foam per second. The pressure for sending the beverage 20 is, for example, preferably 0.1 MPa to 0.2 MPa when the temperature of the beverage 20 in the barrel 21 is adjusted to 15° C. or lower using an air cooler, and is preferably 0.2 MPa to 0.3 MPa when the temperature of the beverage 20 in the barrel 21 is adjusted to 15° C. or higher using an instantaneous cooler.

After the foam is dispensed, when the user operates the switch 49 of the operation unit 48 to release the selection of the state for dispensing the beverage, the dispensing device 1 enters the standby state, and the control unit 47 sets both the pull solenoid 39 of the first valve unit 31 and the push solenoid 45 of the second valve unit 32 to the OFF state (non-energized state). In this manner, the flow of the beverage 20 inside the tube 12 is blocked.

[C. Lower Block and Upper Block of Second Valve Unit]

A configuration and an operation of the second valve unit 32, in particular, those of the lower block 42 and the upper block 43 will now be explained.

As shown in FIG. 2(a), the lower block 42 has a substantially U-shape cross section, in a view along the direction of the central axis 50 of the tube 12, and has a tube housing groove 52 extending along the central axis 50 in a section 51 (see (b) in FIG. 2) substantially at the center with respect to the direction of the central axis 50. The tube housing groove 52 has a left wall 53 and a right wall 54 (a pair of side walls) facing each other with an interval therebetween in a horizontal direction (e.g., in the direction of the arrow x in the drawing) that is orthogonal to the central axis 50 of the tube 12, and a bottom wall 55 connecting bottom ends of the left wall 53 and the right wall 54. There is an opening on the opposite side (upper side in the drawing) of the bottom wall 55. The left wall 53 has a left surface 56 facing the right wall 54, and the right wall 54 has a right surface 57 facing the left wall 53, the both surfaces being flat surfaces extending in the vertical direction.

In the embodiment, the bottom wall 55 has a bottom surface 58 including a left sloped surface 59 extending diagonally upward from the bottom end of the left surface 56 toward the right surface 57, and a right sloped surface 59 extending diagonally upward from the bottom end of the right surface 57 toward the left surface 56. The left and the right sloped surface 59 together form a projection 60 projecting upwards. The left sloped surface 59 and the right sloped surface 59 are inclined by the same inclination angle. Therefore, the left sloped surface 59 and the right sloped surface 59 are connected to each other at a point just in the middle between the left surface 56 and the right surface 57. The projection 60 is provided in order to push up the tube into an upper groove 63, to be described later.

As shown, the lower block 42, particularly the bottom surface 58 of the bottom wall 55, functions as a holder or holder member that is in contact with and holds the bottom surface of the tube 12, when the tube 12 is in a natural state shown (this state is referred to as a "non-deformed state").

The interval between the left surface 56 and the right surface 57 (that is, the groove width) is larger than the outer diameter of the tube 12, and is preferably determined, as will be described later, to ensure gaps on the left and right sides of the tube 12, so that the left surface 56 and the right surface 57 do not interfere with the tube 12 even when the tube 12 is in the natural state, when the tube is deformed by being pressed in the vertical directions (deformed state) [see FIG. 4], as well as when the positions of the left and right end portions 172 (see FIG. 4) of the tube 12 change due to a dimensional error of the tube 12, for example.

Figure 3:
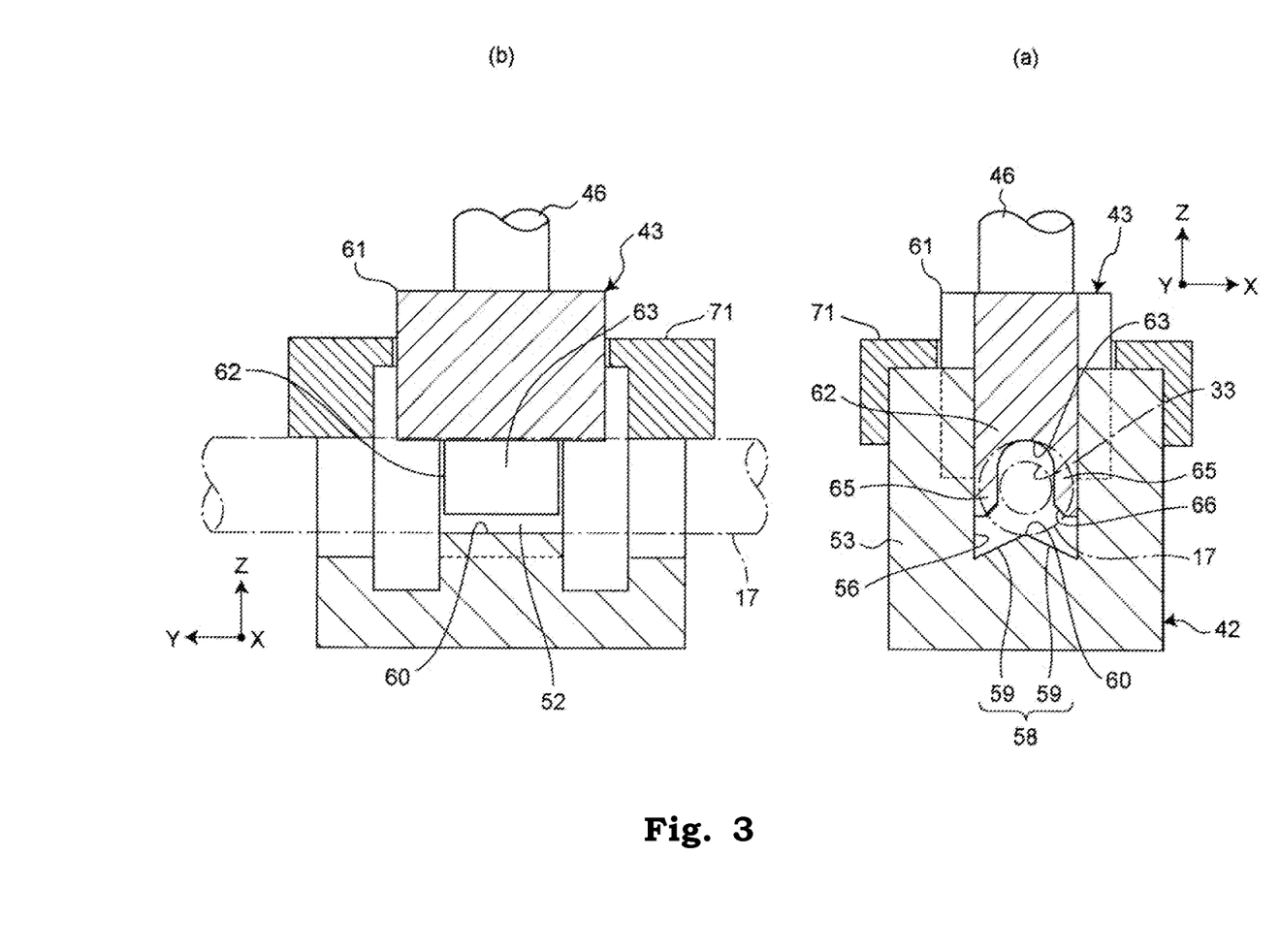
FIG. 3 is a schematic showing a tube pressing portion of the foaming mechanism shown in FIG. 1, at the time of dispensing beer foam, where

The upper block 43 comprises an upper block portion 61 and a lower block portion 62 that are integrated with each other. The upper block portion 61 is connected to the plunger 46 of the push solenoid 45. The lower block portion 62 is inserted into an upper portion of the tube housing groove 52 of the lower block 42. As shown in FIG. 2(a), the width of the lower block portion 62 is the same or substantially the same as the width of the tube housing groove 52 in the horizontal direction orthogonal to the tube central axis 50 (in the direction of the arrow x). As shown in FIG. 2(b), the width of the lower block portion 62 in the direction parallel with the central axis 50 of the tube 12 (e.g., in the direction of the arrow y shown in the drawing) is the same as or substantially the same as the length of the tube housing groove 52. Therefore, the upper block 43 is movable between a raised position shown in FIGS. 2(a) and 2(b) and a lowered position shown in FIGS. 3(a) and 3(b), with respect to the lower block 42. Note that it is also possible to provide a guide member 71 to guide the raising and lowering movements of the upper block 43.

As shown in FIG. 2(a), the bottom surface of the lower block portion 62 has an upper groove 63 extending in a direction parallel with the tube central axis 50 (y direction) and recessed upwards. The upper groove 63 has a shape that is symmetrical with respect to a vertical axis 64 positioned just in the middle between the left surface 56 and the right surface 57 of the tube housing groove 52. With this, a pair of fork-like protruding portions (tube pressing portions) 65 facing each other with the upper groove 63 therebetween are provided to the respective sides of the upper groove 63 of the lower block portion 62. The protruding portions 65 have the same length in the vertical direction, and the bottom ends of the respective protruding portions 65 are positioned at the same height. As a result, when the upper block 43 is lowered, the bottom ends of the left and right protruding portions 65 are brought into contact with the outer peripheral surface of the tube 12. As a result, the tube 12 is positioned just in the middle between the protruding portions 65 (that is, at the center of the tube housing groove 52).

An inner corner of the bottom end of each of the protruding portions 65, the inner corner being a corner adjacent to the opening of the upper groove 63 on the bottom, is chamfered to form a chamfered portion 66 having a sloped surface or a curved surface (not shown). By providing the chamfered portions 66, even when the tube 12 is thick or the tube 12 is hard, the upper block 43 is allowed to press and deform the tube 12 more reliably, and to easily position the tube 12 to the center at the time of pressing. Therefore, when the upper block 43 is lowered toward the lower block 42 from the retracted position, shown in FIGS. 2(a) and 2(b), to the advanced position, shown in FIGS. 3(a) and 3(b), with the lower block portion 62 being guided along the tube housing groove 52, the tip end surface and the chamfered portion 66 of each of the protruding portions 65 squashes the corresponding diagonally upper portion of the outer periphery of the tube 12 that is housed inside the tube housing groove 52 (that is, symmetrical parts of the outer periphery with respect to the central axis 50, within a range of about 30 degrees to about 60 degrees in the clockwise and counterclockwise directions with respect to a vertical plane that comprises the central axis 50 (at the position of 12 o'clock). In this manner, the upper block 43, the pair of protruding portions 65 in particular, functions as a pressing member that presses the tube 12, when the tube 12 is to be pressed and deformed. As a result, as shown in FIG. 4, the left and right end portions of the tube 12 become curved and inner surfaces thereof come into contact with each other. Opposing surfaces of the central portion of the tube 12 do not come into contact with each other, so that a deformed bore 33 is formed. The bore 33 of the deformed tube 12 has a substantially semicircular or substantially crescent-shaped cross section. At this time, with a tube having an outer diameter of 5.0 mm and an inner diameter of 3.0 mm, for example, the bore has a cross-sectional area of 0.2 mm$^2$ to 1.0 mm$^2$, preferably 0.4 mm$^2$ to 0.9 mm$^2$. The cross-sectional area of the bore herein is a cross-sectional area of the section of the tube when the tube is pressed, with no consideration given to the effects of the beverage flowing through the tube, the gas pressure, and the stress applied to the tube when the tube is attached to the beverage dispensing device.

Figure 5:
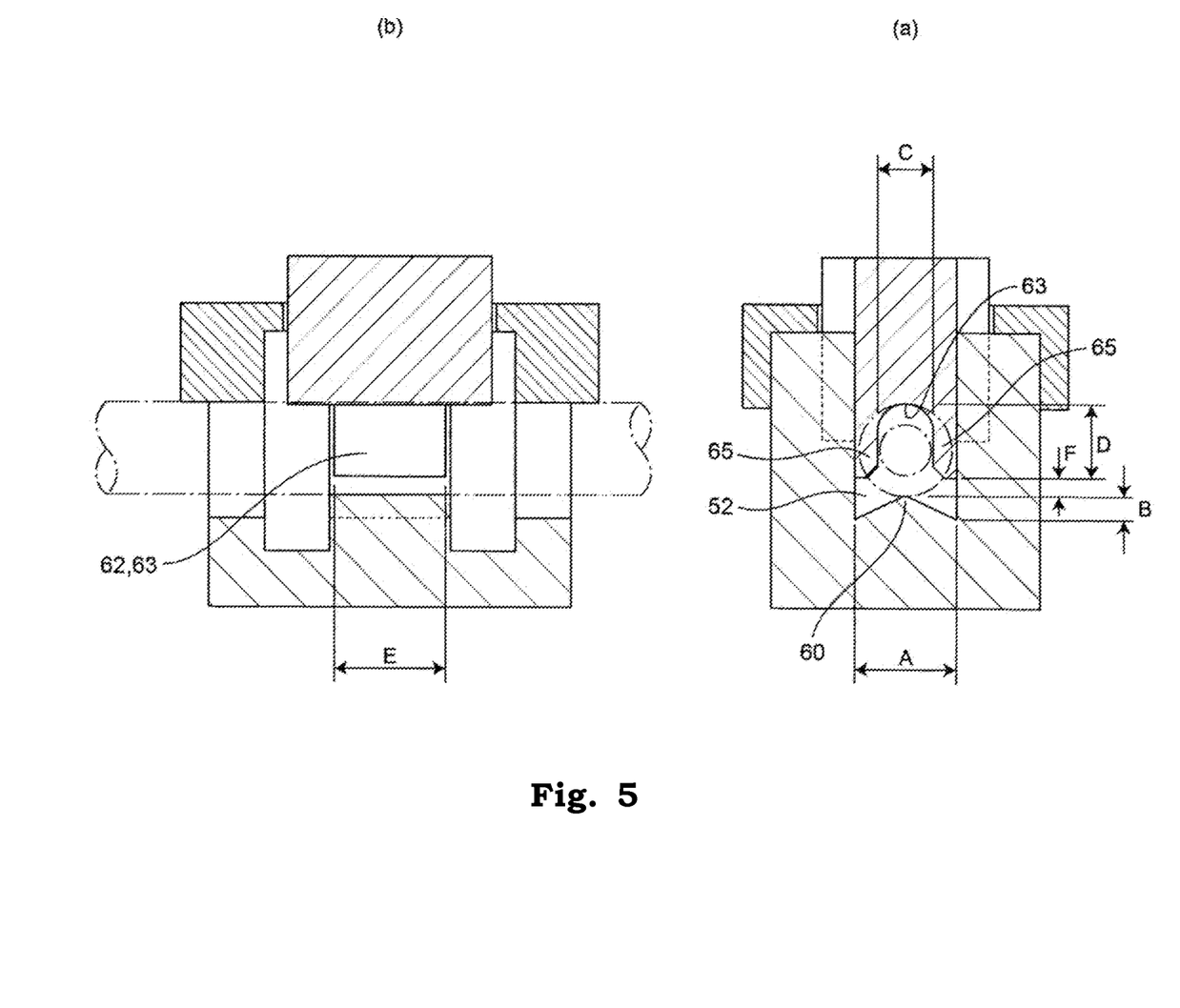
FIG. 5 is a schematic with dimensional lines added to FIGS. 2(a) and 2(b).

Referring to FIG. 5, for example, assuming a tube having an outer diameter of 5.0 mm and an inner diameter of 3.0 mm, the width (A) of the tube housing groove 52 may be 6.0 mm or larger, preferably 6.0 mm to 8.0 mm: the height (B) of the projection 60 in the center of the bottom surface of the tube housing groove 52 may be 0 mm to 2.0 mm, preferably 0.5 mm to 1.5 mm: the width (C) of the upper groove 63 may be 2.0 mm to 4.0 mm: the depth (D) of the upper groove 63 may be 2.0 mm or larger, preferably 2.0 to 4.0 mm: the length (E) of the protruding portions 65 in the central axis direction may be 1.0 mm to 10.0 mm: and the distance (F) between the bottom end of the protruding portions in the advanced position and the projection in the center of the tube housing groove may be 1.0 mm to 2.5 mm.

By elongating the length (E) of the protruding portions 65 in the central-axis direction, the flow rate can be stabilized when the foam is dispensed, so the foam can be dispensed stably. However, when the length is too long, a greater force will be required to press the protruding portions 65, so that the sizes of the push solenoid 43 and the power supply unit will be increased as well. Therefore, the length is preferably 2.0 mm to 8.0 mm, and more preferably 2.0 mm to 6.0 mm.

The amount by which and the shape into which the tube 12 deforms vary depending on factors such as the pressing force that the tube 12 receives from the push solenoid 43 via the upper block 43, the shape of the bottom end of the protruding portion 65 (e.g., the inclination angle of the chamfered portions 66), and the frictional angle between the protruding portion 65 and the tube 12. For example, when an inclination angle θ of the chamfered portion 66 of the protruding portion 65 (see FIG. 4) is large and the frictional force exerted between the chamfered portions 66 and the outer peripheral surface of the tube is small, the upper central portion of the tube 12 gets into the upper groove 63 deeply (to a level near the ceiling or the bottom surface 67). Conversely, when the inclination angle θ is small or the frictional force exerted between the chamfered portions 66 and the outer peripheral surface of the tube is small, the amount by which the upper central portion of the tube 12 gets into the upper groove 63 is smaller.

The width of the tube housing groove 52 and the width of the upper groove 63 with respect to the size of the tube 12 (the outer diameter and the inner diameter thereof) are determined in such a manner that, in a configuration in which the tube is pressed, as shown in FIG. 4, an upper central portion (central tube portion) 171 of the deformed tube 12 goes into the upper groove 63: the left and right end portions (tube portions) 172 of the deformed tube 12 are pressed and held by the protruding portions 65 and the groove bottom surface 58 (the sloped surfaces 59); a space 68 is ensured between the upper central portion 171 of the deformed tube 12 and the bottom surface 67 of the upper groove 63; and a space 69 is ensured between the left end portion 172 of the deformed tube 12 and the left surface 56, and a space 70 is ensured between the right end portion 172 and the right surface 57. Even when the upper central portion 171 or the left and right end portions 172 of the tube 12 change due to factors such as a dimensional error of the tube 12, by ensuring that the bottom surface 67, the left surface 56, and the right surface 57 do not interfere with the tube 12, the cross-sectional shape of the deformed tube 12 and the cross-sectional shape of the deformed tube bore can be kept constant.

The protruding portions 65 and the groove bottom surface 58 (sloped surfaces 59) act to press the left and right end portions 172 of the tube 12, to completely close the left and right end portions of the passage. By contrast, the upper central portion 171 of the tube 12 is not pressed, so that a smaller beverage passage 33 is formed. With this configuration, even when an operation error of the pressing mechanism occurs or the tube has a dimensional error, the passage is not blocked completely, and it is possible to minimize the change in the bore cross-sectional area of the tube 12.

With the second valve unit 32 configured as described above, at the time of dispensing the beverage, the upper block 43 is at the retracted position away from the tube 12, and does not block the flow of the beverage 20, as shown in FIG. 2(a). By contrast, at the time of dispensing foam, the upper block 43 is lowered, thereby causing the protruding portions 65 to press the outer peripheral surface of the tube 12 symmetrically, and the tube to deform into the shape shown in FIG. 4. In this manner, regardless of the dimensional error in the tube 12 or an operation error of the pressing mechanism, the compressed cross section of the tube bore 33 remains substantially constant. As a result, foam can be produced from the beverage 20 passing through the compressed cross section, stably.

Note that, when the hollow cylindrical tube is simply pressed from in the vertical direction, the deformed cross section of the bore becomes an elliptical shape that is flat in the lateral direction, and the deformed cross section of the bore changes greatly even with a slight difference in the amount by which the upper block is pressed or a dimensional error in the tube, and, in some cases, the passage becomes closed. According to the embodiment described above, by contrast, the cross-sectional area of the bore of the deformed tube remains substantially constant, regardless of the amount by which the tube is pressed, or the dimensional error in the tube. Therefore, it is possible to produce foam with a stable quality.

As described above, in the beverage dispensing device according to the embodiment described above, a flexible tube forms at least a part of the passage for supplying the beverage, and the beverage can be foamed by pressing the flexible portion to compress the cross section of the bore. Furthermore, because the tube is easily removable from the support members, the beverage dispensing device with a clean passage can be achieved by replacing the tube. It is therefore extremely easy to clean the beverage dispensing device. In addition, any complicated mechanism such as a valve body for foaming the beverage does not need to be provided to the tube that is replaced, so that the cost of the tube can be reduced.

OTHER EMBODIMENTS

There are various possible modifications of the dispensing device 1 according to the embodiment described above.

First Modification

For example, in the above description, when the first valve unit 31 is in the open state, the upper block (movable block) 37 is retracted above the tube 12, and not in contact with the tube 12. It is, however, also possible for the upper block 37 at the retracted position to be in contact with the outer peripheral surface of the tube 12, or to be in contact with the tube 12 and to keep the tube 12 deformed within a range not affecting the quality of the beverage 20 being dispensed. In the same manner, in the above description, in the non-deformed state, the upper block 43 is retracted above the tube 12, and the second valve unit 32 is not in contact with the tube 12. It is however also possible for the upper block 43 at the retracted position to be in contact with the outer peripheral surface of the tube 12, or to be in contact with the tube 12 and to keep the tube 12 deformed within a range not affecting the quality of the beverage 20 being dispensed.

However, from the viewpoint of workability of replacing the tube 12, it is preferable, in the open state of the first valve unit 31, for the upper block (movable block) 37 not to be in contact with the tube 12, and for the upper block 43 not to be in contact with the tube 12, in the non-deformed state of the second valve unit 32.

Second Modification

In the above description, the upper block (movable block) 37 of the first valve unit 31 is disposed above the lower block (fixed block) 36, but the upper block may be disposed below the lower block. In the same manner, in the above description, the upper block (movable block) 43 of the second valve unit 32 is disposed above the lower block (fixed block) 42, but the upper block 43 having the shape described above may be disposed below the lower block 42 having the shape described above.

Third Modification

In the above description, the upper block 37 of the first valve unit 31 is movable, and the lower block 36 is fixed, but the upper block 37 may be fixed and the lower block 36 may be movable. In such a configuration, the solenoid is connected to the lower block 36. Similarly, in the above description, the upper block 43 of the second valve unit 32 is movable and the lower block 42 is fixed, but the upper block 43 may be fixed and the lower block 42 may be movable.

Fourth Modification

In the above description, the left wall 53 and the right wall 54 (a pair of side walls) are provided to the lower block 42 of the second valve unit 32, but it is also possible to provide the pair of side walls to the upper block 43.

Fifth Modification

In the above description, a pull solenoid is used in the first valve unit 31 and a push solenoid is used in the second valve unit 32, but a push solenoid may be used in the first valve unit and a pull solenoid may be used in the second valve unit. For example, when the upper block 37 is a movable block and the lower block 36 is a fixed block, as in the embodiment described above, the push solenoid is disposed below the lower block of the first valve unit, and the pull solenoid is disposed in the upper block of the second valve unit.

Sixth Modification

In the above description, a pull solenoid is used in the first valve unit 31, and a push solenoid is used in the second valve unit. However, solenoids of the same type (pull or push solenoids) may be used in both of these valve units. In this case, for example, the first valve unit 31 comprises a pull solenoid disposed above the upper block, in the manner described above, and the second valve unit comprises a pull solenoid disposed below the lower block; or the first valve unit 31 comprises a push solenoid disposed below the lower block, and the second valve unit comprises a push solenoid disposed above the upper block, in the manner described above.

Seventh Modification

In the above description, the solenoid is provided in each of the first valve unit 31 and the second valve unit 32. It is, however, also possible to use one dual-use solenoid, for example, and to connect one end of the plunger to the movable block of the first valve unit 31 to drive the first valve unit 31, and the other end of the plunger may be connected to the movable block of the second valve unit 32 to drive the second valve unit 32. With this modification, one solenoid can be used to drive both the valve units simultaneously.

Eighth Modification

In the above embodiment and modifications, the tube 12 is disposed in the horizontal direction, and a horizontal portion of the tube is squeezed. It is, however, also possible to squeeze a portion of a tube disposed in the vertical direction or a diagonal direction. In the embodiment and the modification described above, the entire beverage transport tube is made of an elastic material. However, at least the portion pressurized and deformed by the first valve unit 31 and the second valve unit 32 may be made of an elastic material as a flexible portion, and the other portion may be made of an inelastic material.

Ninth Modification

In the above embodiment and modifications, the solenoid is provided as driving source to each of the driving unit 38 of the first valve unit 31 and the driving unit 44 of the second valve unit 32. It is, however, also possible for at least one of these solenoids to be replaced with another type of actuator or a motor. When a motor is used as the driving source, it is preferable that, for example, to provide a gear mechanism (for example, a rack-and-pinion) between the motor and the movable block, and for the rotational motion of the motor to be converted into linear motion via the gear mechanism. However, the driving source and the mechanism for communicating the driving force are not limited to these embodiments.

Tenth Modification

In the above embodiment and modifications, the switch is provided to the operation unit, and the solenoid or the motor is driven based a signal output from the switch, to switch the dispensing device among the three states (standby state (non-dispensing state), beverage dispensing state, and foaming state). However, in the device in which the position of the tapping handle (operation lever) is manually switched to dispense the beverage, the tapping handle may be mechanically connected to movable blocks, and the two movable blocks may be switched depending on the position of the tapping handle: or a detector may be used to detect the position of the tapping handle, and the two movable blocks may be switched using a solenoid or a motor that is driven based on the output of the detector.

Eleventh Modification

In the above embodiment and modifications, the shapes of the upper block 43 and the lower block 42 of the second valve unit 32 are determined in such a manner that the left and right end portions of the tube 12 are pressed thereby. However, it is not always necessary for the upper block 43 and the lower block 42 to press the left and right end portions of the tube 12, and the shapes of the upper block 43 and the lower block 42 may be determined in such a manner that only a part of the tube 12 is pressed thereby. For example, only one of the left side and the right side of the tube 12 may be pressed. In such a configuration, for example, the protruding portion may be provided only one of the left side and the right side of the upper block. With such a configuration, too, it is possible to prevent complete blockage of the passage, and to minimize a change in the cross-sectional area of the bore of the tube 12, even when the pressing mechanism experiences an operational error, or the tube has some dimensional error; although it would be difficult to ensure the tube 12 to be positioned at the optimum position when the tube 12 is pressed, compared with the configuration according to the embodiment described above.

EXAMPLES

Exemplary conditions for designing the beverage dispensing device described above will be provided below.

[Beverage]
  Beer
[Gas Pressure (Pressure of Gas Supplied from Gas Cylinder to Barrel)]
  1.5 MPa
[Tube]
  Tube Material: Silicone
  Dimensions in natural condition
    Outer diameter: 5 mm (dimensional tolerance: +0.1 mm)
    Inner diameter: 3 mm (sectional area: 7.068 mm$^2$) (dimensional tolerance: +0.1 mm)
[Sectional Area of Bore of Compressed Tube]
  Sectional area of bore of compressed tube: About 0.9 mm$^2$
[Dimensions of Fixed Block and Movable Block (See FIG. 5)]
  Fixed block
    Width (A) of tube housing groove: 5.6 mm
    Height (B) of projection at center of bottom surface of tube housing groove:
      1.0 mm
  Movable block
    Width (C) of upper groove: 3.0 mm
    Depth (D) of upper groove: 4.0 mm
    Length (E) of protruding portion in central axis direction: 6.0 mm
[Movable Block at Advanced Position]
  Distance (F) between bottom ends of protruding portions at advanced position and projection at center of tube housing groove: 1.8 mm
[Observations]

Using the dispensing device set in the above conditions, the conditions of the beer foam was observed. Even when the tube was replaced with another tube with a dimensional error, stable creamy beer foam was produced at a flow rate of about 5 to 10 milliliters per second. A photograph of the foam immediately after the foam was dispensed was taken using a microscope, and the distribution of the foam particle diameters and the count-based arithmetic average of the diameters were calculated. As a result, the average diameter (98.8 μm, standard deviation: 26.2 μm) of the foams dispensed using the beverage dispensing device according to the example was about the same as the average diameter (99.2 μm, standard deviation: 23.8 μm) of the foams dispensed using the existing beer tap (passage cross-sectional area when the foams are dispensed: 0.502 mm$^2$).

EXPLANATION OF REFERENCES 1 dispensing device
10 beverage dispensing unit
12 tube
20 Beer
31 first valve unit
32 second valve unit
33 tube bore
35 pressing mechanism
36 lower block (fixed block)
37 upper block (movable block)
38 driving unit
39 pull solenoid
41 pressing mechanism
42 lower block (fixed block)
43 upper block (movable block)
44 driving unit
45 push solenoid
50 central axis
52 tube housing groove
53 left wall
54 right wall 55 bottom wall
61 upper block portion
62 lower block portion
63 upper groove
65 protruding portion

The invention claimed is:

1. A beverage dispensing device that uses a combination of tubes each having a flexible portion that is elastically deformable as a passage of a beverage, the beverage dispensing device comprising a mechanism configured to set a bore of the flexible portion to a first state having a first cross-sectional area or a second state having a second cross-sectional area that is smaller than the first cross-sectional area, selectively, wherein:

when the bore of the flexible portion is in the second state, foam is generated from the beverage flowing through the tube, the mechanism comprises a pressing mechanism configured to press the flexible portion, the pressing mechanism comprises a pressing portion, the pressing portion comprising a pair of members facing each other with the flexible portion interposed therebetween, one of the pair of members of the pressing portion is a holder member configured to contact with the flexible portion and hold the flexible portion when the bore of the flexible portion is in the first state and the second state, the other of the pair of members is a pressing member configured to press the flexible portion when the bore of the flexible portion is switched from the first state to the second state, the other of the pair of members comprises
 a pair of protruding portions protruding toward the one of the pair of members and facing each other with a central axis of the flexible portion that is disposed between the pair of members interposed therebetween; and
 a groove provided between the pair of protruding portions, and the groove has a depth such that the flexible portion in the second state is out of contact with a bottom surface of the groove.

2. The beverage dispensing device according to claim 1, wherein chamfered portions are provided to ends of the pair of respective protruding portions, the ends facing the flexible portion.

3. The beverage dispensing device according to claim 1, wherein the pressing member is disposed above the flexible portion and the holder member is disposed under the flexible portion.

4. The beverage dispensing device according to claim 1, wherein the pressing mechanism presses only a part of a cross section of the flexible portion in the second state.

5. The beverage dispensing device according to claim 1, wherein the flexible portion has a part in which the cross section of the bore has a substantially semicircular shape or a substantially crescent shape, in the second state.

6. The beverage dispensing device according to claim 1, wherein the flexible portion has a part inner surfaces of which come into contact with each other, the part being a part pressed and caused to deform by the pair of members, in the second state.

7. The beverage dispensing device according to claim 1, wherein the one of the pair of members comprises a projection at a position coming into contact with a central portion of the flexible portion.

8. The beverage dispensing device according to claim 1, wherein the pressing portion comprises a pair of side walls provided integrally with the one member of the pair of members or the other member of the pair of members, and facing each other with the flexible portion interposed therebetween in a direction perpendicular to a direction in which the one member of the pair of members and the other member of the pair of members face each other.

9. The beverage dispensing device according to claim 8, wherein an interval between the pair of side walls has a size that the flexible portion does not come into contact with the pair of side walls when the flexible portion is in the first state and when the flexible portion is in the second state.

10. The beverage dispensing device according to claim 1, wherein the pressing member is driven by an actuator.

11. The beverage dispensing device according to claim 1, wherein the beverage dispensing device and/or the tube comprises a passage opening/closing mechanism for opening/closing the passage of the beverage.

12. The beverage dispensing device according to claim 11, wherein an opening/closing portion of the passage, the opening/closing portion being opened and closed by the passage opening/closing mechanism, is located upstream of the flexible portion in a direction in which the beverage is transported.

13. The beverage dispensing device according to claim 1, further comprising an operation unit, wherein the operation unit is capable of selecting any one of a state for dispensing no beverage, a state for dispensing a beverage, and a state for dispensing foam, when the state for dispensing no beverage is selected on the operation unit, the flexible portion is switched to the first state, and the passage opening/closing mechanism closes the passage so that no beverage is dispensed, when the state for dispensing the beverage is selected on the operation unit, the flexible portion is switched to the first state, and the passage opening/closing mechanism opens the passage so that the beverage is dispensed, and when the state in which for dispensing foam is selected on the operation unit, the flexible portion is switched to the second state, and the passage opening/closing mechanism opens the passage so that the foam is dispensed.

\* \* \* \* \*